3,180,965
WELDING METHOD
R. L. Kitrell, 3909 S. Jamestown Ave., Tulsa, Okla.
Filed May 23, 1962, Ser. No. 197,015
7 Claims. (Cl. 219—61)

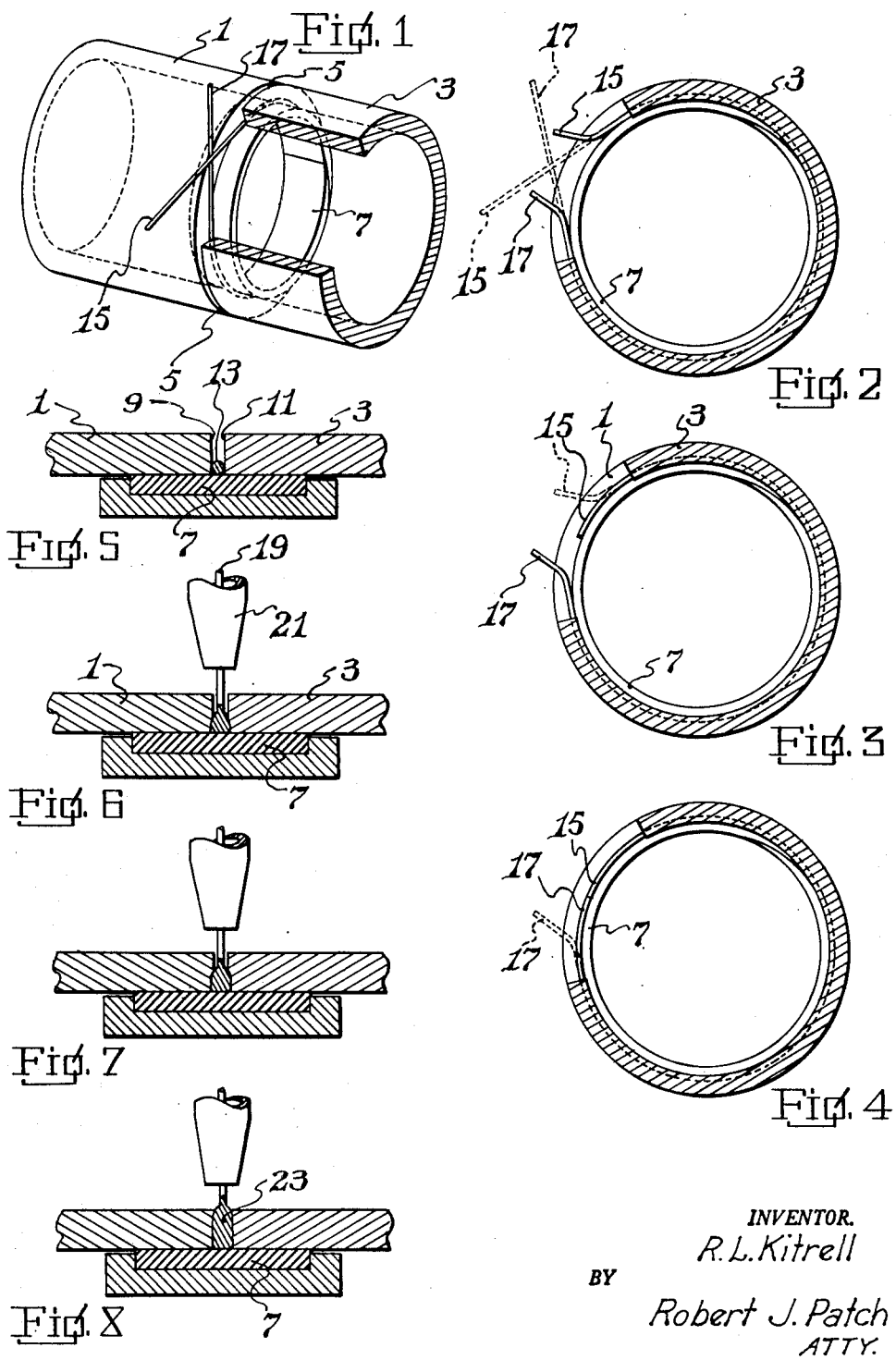

The present invention relates to welding methods, and more particularly to electric arc welding methods for producing butt welds by use of a backup member on the far side of the joint to be welded.

It is an object of the present invention to provide welding methods that will assure that the weld is uniform and sound throughout.

Another object of the present invention is the provision of welding methods that assure that the size of the joints will be uniform and closely controllable.

Still another of the objects of this invention is the provision of welding methods for use with backup members, which methods assure that the weld builds progressively from the backup member outward.

Still another object of the present invention is the provision of welding methods designed to achieve the above objects in the environment of endwise aligned cylindrical workpieces backed up by a backup ring within the workpieces at the joint.

Finally, it is an object of the present invention to provide welding methods that will be inexpensive, fast, easy to perform and dependable.

Other objects and advantages will become apparent from a consideration of the following disclosure, taken in connection with the accompanying drawing, in which:

FIGURE 1 is a fragmentary perspective view, with parts broken away, showing an assembly according to the present invention, prior to welding, when the weld wire has just been applied;

FIGURE 2 is a view in cross section of the assembly of FIGURE 1, showing the next step in the operation;

FIGURE 3 is a view similar to FIGURE 2 but showing a still further step;

FIGURE 4 is a view similar to FIGURES 2 and 3, but showing the next step;

FIGURE 5 is an enlarged radial cross sectional view of the joint to be welded;

FIGURE 6 is a view similar to FIGURE 5 but showing the actual welding operation;

FIGURE 7 is a view similar to FIGURE 6 showing a further stage of the welding operation; and FIGURE 8 is a view similar to FIGURES 6 and 7 but showing the pass that completes the welding operation.

Referring now to the drawing in greater detail, there is shown a pair of axially aligned cylindrical endwise adjacent pipe sections 1 and 3 which define between their adjacent ends the joint 5 to be welded. As has recently become conventional in pipe welding operations, an annular backup ring 7 of highly heat-conductive material such as copper is disposed within the adjacent squared ends 9 and 11, respectively, of sections 1 and 3 and performs the dual function of holding the ends precisely aligned and also of rapidly conducting heat away from the weld so that the melt does not weld to the backup ring but rather hardens with a smooth interior surface, all in a manner well known in this art.

A welding wire 13 of circular cross section and a thickness less than the thickness of squared ends 9 and 11 of the workpieces 1 and 3 is disposed tightly about backup ring 7 and is clamped tightly between pipe sections 1 and 3. The opposite ends 15 and 17 of wire 13 have been cut off to a length such that when they are pressed down between squared ends 9 and 11, cut off ends 15 and 17 approximately abut.

The method of the present invention proceeds as follows:

With the pipe sections 1 and 3 in approximate alignment, backup ring 7 is applied within the joint 5, for example by the apparatus of U.S. Patent No. 2,878,770. Pipe sections 1 and 3 are initially spaced apart a distance greater than the thickness of welding wire 13, so that wire 13 may now be wrapped about backup ring 7 in joint 5 and pulled tight to the position of FIGURE 1. With wire 13 in this position, the pipe sections 1 and 3 are then moved together until they tightly clamp wire 13 between them. This holds wire 13 not only in contact with squared ends 9 and 11 of the pipe sections but also in contact with backup ring 7.

From the position shown in FIGURE 1, ends 15 and 17 of wire 13 are then cut off to the length shown in FIGURE 2, the major portion of the length of the wire 13 being clamped between the pipe ends. Wire ends 15 and 17 are then caulked down into joint 5, first to the position shown in FIGURE 3, and finally to the position shown in FIGURE 4. In this completed position of the weld assembly, the weld wire has the position shown by comparison of FIGURES 4 and 5. As seen in FIGURE 5, welding wire 13 is in line contact with backup ring 7 and with squared ends 9 and 11, thanks to the fact that wire 13 is circular in cross section and contacts a flat surface over an area no greater than a line.

Next comes the welding operation itself, and for this purpose a consumable electric welding electrode 19 is used which is preferably of the same material as wire 13 and which is continuously fed to the weld during the welding process through a nozzle 21 which also serves as a means for shielding the weld with carbon dioxide or argon or some other inert gas or gaseous mixture in a manner well known in this art.

Electrode 19 is placed closely adjacent wire 13, and an arc is struck between electrode 19 and wire 13. Wire 13 and the adjacent end of electrode 19 both melt and form the melt 23 of the weld. Wire 13 has only line contact with the backup ring 7 and with squared ends 9 and 11; and hence, the melting of these portions is speeded up. Wire 13 melts at the bottom of the joint, against the backup ring, which latter abstracts the heat so quickly that the melt does not stick to the ring.

Preferably, the welding operation is performed in a number of passes, that is, repetitive movements along the same line of weld, and a comparison of FIGURES 6, 7 and 8 shows these passes sequentially. Each pass adds molten metal to the melt 23, the melt being chilled by the backup ring and by the adjacent butt ends of pipe sections 1 and 3, so that by the time the weld is sufficiently built up, it is already cooled and hardened. Of course, if desired, welding machines of the type that rotate about the workpiece radially outward of the joint may be used with this type of operation. In this way, the melt forms first at the very bottom of the joint immediately adjacent the backup ring and proceeds thence radially outward of the pipe sections.

From a consideration of the foregoing description, it will be obvious that all of the initially recited objects of the present invention have been achieved.

Although the present invention has been described and illustrated in connection with a preferred embodiment it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. A method of welding together a pair of metal workpieces, comprising positioning the workpieces endwise ad- jacent each other with a backup member on one side of the joint to be welded and a welding wire in the joint between the ends of the workpieces and in line contact only with the backup member and the workpieces, striking an electric arc between a welding electrode and the welding wire, and moving the arc lengthwise of the wire to melt the wire in the joint.

2. A method of welding together a pair of hollow cylindrical workpieces, comprising positioning the workpieces endwise adjacent each other with their axes aligned and with a backup ring on the inner side of the joint to be welded and a welding wire in the joint between the ends of the workpieces and in line contact only with the backup member and the workpieces, striking an electric arc between a welding electrode and the welding wire, and moving the arc lengthwise of the wire to melt the wire in the joint.

3. A method of welding together a pair of cylindrical workpieces, comprising positioning the workpieces endwise adjacent each other with their axes aligned and with a backup ring on the inner side of the joint to be welded, wrapping a flexible welding wire of a length substantially greater than the outer circumference of the backup ring about the backup ring in the joint, pulling in opposite directions on the ends of the welding wire outside the joint to draw the welding wire into the joint tight against the backup ring, moving the workpieces toward each other until the wire is tightly held between them and against the backup member, cutting off at least one end of the wire until the wire has a length about equal to the outer circumference of the backup ring, caulking the ends of the wire into the joint against the backup ring until the ends of the wire substantially abut each other, striking an electric arc between a welding electrode and the welding wire, and moving the arc lengthwise of the wire to melt the wire in the joint.

4. A method as claimed in claim 1, in which the welding wire is round welding wire.

5. A method as claimed in claim 2, in which the welding wire is round welding wire.

6. A method as claimed in claim 3, in which the welding wire has only line contact with the backup ring and the workpieces.

7. A method as claimed in claim 6, in which the welding wire is round welding wire.

References Cited by the Examiner
UNITED STATES PATENTS

| | | | |
|---|---|---|---|
| 1,630,037 | 5/27 | Stresau | 219—61 |
| 1,643,227 | 9/27 | Stresau | 219—61 |
| 1,826,355 | 10/31 | Lincoln | 219—122 |
| 2,133,058 | 10/38 | Paine | 219—137 |
| 2,206,375 | 7/40 | Swift | 219—137 |
| 2,792,490 | 5/57 | Risch et al. | 219—137 |

RICHARD M. WOOD, *Primary Examiner.*